(12) United States Patent
Cook et al.

(10) Patent No.: US 10,325,099 B2
(45) Date of Patent: Jun. 18, 2019

(54) MANAGING SENSITIVE PRODUCTION DATA

(71) Applicant: Microsoft Technology Licensing, LLC, Redmond, WA (US)

(72) Inventors: Stephen J. Cook, Chelmsford (GB); Jackson M. Davis, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/100,007

(22) Filed: Dec. 8, 2013

(65) Prior Publication Data

US 2015/0161397 A1 Jun. 11, 2015

(51) Int. Cl.
H04L 29/00 (2006.01)
G06F 21/60 (2013.01)
G06F 21/62 (2013.01)

(52) U.S. Cl.
CPC .......... *G06F 21/60* (2013.01); *G06F 21/6245* (2013.01); *G06F 21/6254* (2013.01)

(58) Field of Classification Search
USPC ............................................. 713/193; 726/26
See application file for complete search history.

(56) References Cited

U.S. PATENT DOCUMENTS

| 6,823,203 | B2 | 11/2004 | Jordan |
| 7,228,503 | B1 * | 6/2007 | Wang ...................... G06Q 10/06 715/733 |
| 7,757,278 | B2 | 7/2010 | Boneh et al. |
| 8,375,224 | B2 * | 2/2013 | Youn et al. .................... 713/193 |
| 2006/0005017 | A1 | 1/2006 | Black et al. |
| 2008/0126301 | A1 | 5/2008 | Bank et al. |
| 2009/0106262 | A1 | 4/2009 | Fallen et al. |
| 2009/0132419 | A1 * | 5/2009 | Grammer ............ G06F 21/6245 705/50 |
| 2010/0042583 | A1 | 2/2010 | Gervais et al. |
| 2010/0205189 | A1 | 8/2010 | Ebrahimi et al. |

(Continued)

FOREIGN PATENT DOCUMENTS

CN 1501623 A 6/2004

OTHER PUBLICATIONS

Yumerefendi, et al., "TightLip: Keeping Applications from Spilling the Beans", In Proceedings of the 4th USENIX Conference on Networked Systems Design & Implementation, Apr. 11, 2007, 19 pages.

(Continued)

*Primary Examiner* — Jeffrey C Pwu
*Assistant Examiner* — Michael D Anderson
(74) *Attorney, Agent, or Firm* — Buckley, Maschoff & Talwalkar LLC

(57) ABSTRACT

Production data is managed to avoid leakage of sensitive data. One or more of a number of techniques can be employed to discover sensitive data amongst production data. In one instance, data specified about production data in a production application, for example by way of an attribute, can be used to identify sensitive data. Sensitive production data can subsequently be masked to conceal sensitive data from view. Furthermore, metadata regarding sensitive data can be maintained.

20 Claims, 7 Drawing Sheets

(56) References Cited

U.S. PATENT DOCUMENTS

| | | |
|---|---|---|
| 2011/0113050 A1 | 5/2011 | Youn et al. |
| 2011/0161656 A1 | 6/2011 | Rao et al. |
| 2012/0272329 A1 | 10/2012 | Grammer et al. |
| 2013/0167192 A1 | 6/2013 | Hickman et al. |

OTHER PUBLICATIONS

Unknown, "Data Masking Best Practice", In Oracle White Paper, Jun. 2013, 26 pages.

"International Search Report & Written Opinion for PCT Patent Application No. PCT/US2014/067842", dated Feb. 16, 2015, 9 Pages.

"Spring Insight Developer", Retrieved From <<http://pubs.vmware.com/vfabric52/topic/com.vmware.ICbase/PDF/vfabric-tc-server-insight-dev-1.8.3.pdf>>, Nov. 6, 2015, 76 Pages.

"Second Written Opinion issued in PCT Application No. PCT/US2014/067842", dated Nov. 12, 2015, 5 Pages.

"International Preliminary Report on Patentability Issued in PCT Application No. PCT/US2014/067842", dated Feb. 4, 2016, 6 Pages.

"First Office Action and Search Report Issued in Chinese Patent Application No. 201480067158.9", dated Feb. 23, 2018, 11 Pages.

"Second Office Action and Search Report Issued in Chinese Patent Application No. 201480067158.9", dated Oct. 15, 2018, 13 Pages.

"Office Action Issued in Chinese Patent Application No. 201480067158.9", dated Feb. 12, 2019, 9 Pages.

"Office Action Issued in European Patent Application No. 14819183.6", dated Mar. 21, 2019, 4 Pages.

\* cited by examiner

MANAGING SENSITIVE PRODUCTION DATA

BACKGROUND

In production applications, such as real world web sites and web services, it is common for production data comprising an application's memory to contain sensitive data that could compromise the security or integrity of a user. Sensitive data can comprise, among other things, personally identifiable information (PII), which can be used to identify information about individual users. For instance, medical applications will likely contain doctors' notes about patients. Similarly, online store applications likely have credit card numbers of users in memory.

Since production data can include sensitive data, it is undesirable to make such production data accessible outside a production environment. Moreover, this may be required due to legal requirements and privacy agreements. The production data, however, is useful for diagnostic and other purposes. As a result, production data may be available for use within a production environment, if allowed. Otherwise, test data can be utilized in an attempt to replicate production application state.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to managing sensitive production data. More specifically, sensitive data discovered amongst production data can be concealed from view outside a production environment. Sensitive data can be discovered in a number of ways. In accordance with one aspect, class fields or other program constructs in an application can be identified as locations where sensitive data is known to reside. Instances of sensitive data can subsequently be discovered in production data based on the specified locations. Sensitive data discovered by the above or other technique can be masked in various manners so that the sensitive data is not visible. Furthermore, metadata associated with sensitive data can be maintained with respect to the masked sensitive data.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
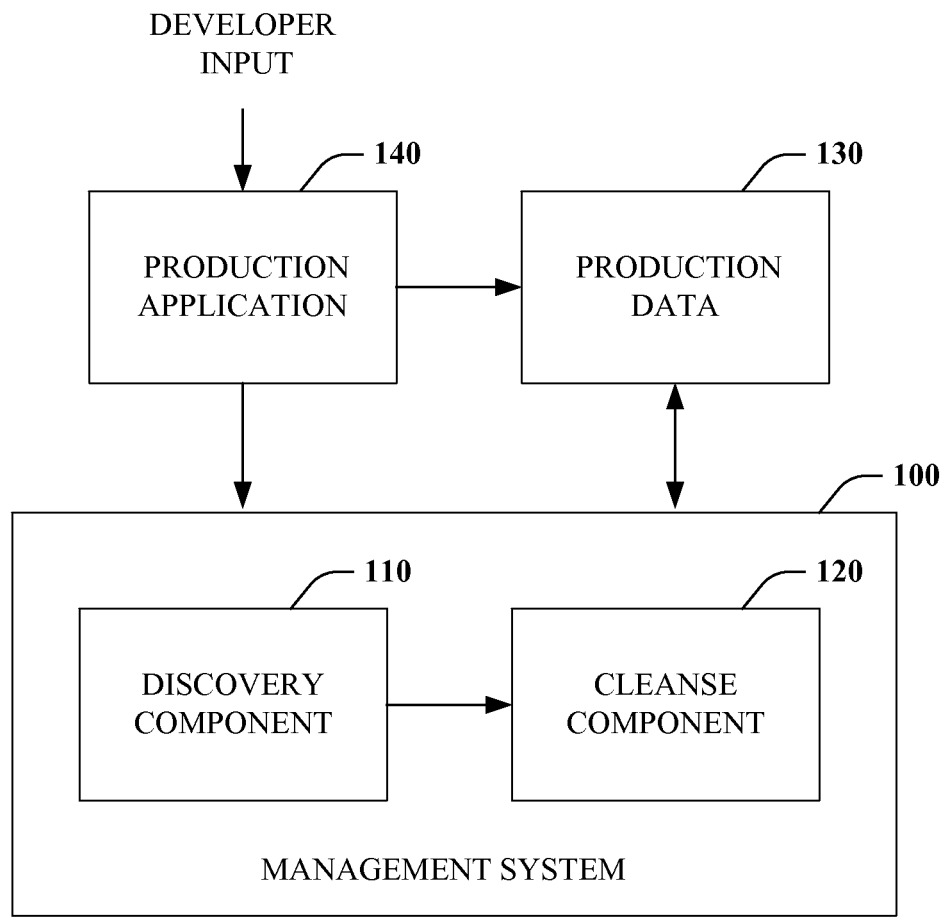
FIG. 1 is a block diagram of a management system.

Applications executing in a production environment, or, in other words, production applications, can operate with respect to real world sensitive data, as opposed to artificial test data. Occasionally, diagnostic or analytic operations are desired over a production application to resolve a problem or improve performance. This can involve looking into the memory of a production application as it is running by taking a memory snapshot and looking through a stack and/or heap in order to find out what is wrong or how execution could be improved. However, the memory may well include sensitive data, such as application user names, addresses, account numbers, passwords, among other things. Accordingly, a problem exists regarding how to enable at least diagnostics and analytics while avoiding leaking sensitive data. Two conventional approaches seek to avoid rather than solve this problem. First, some organizations will simply not allow diagnostic or analytic operations over production data. As a result, operations have to be performed over test data, wherein an attempt is made to replicate states of a production application with test data. Second, if operations are permitted over production data, such operations are allowed solely in a particular physical location with strict security protocol (e.g., monitoring, search).

Details below generally pertain to managing production data to prevent leakage of sensitive data. Production data, which represents the state of an application executing in a production environment, can include sensitive data that should be kept secret. Sensitive data can be discovered utilizing a variety of techniques/mechanisms. In accordance with one aspect, sensitive data can be discovered as a function of identified locations in a production application, such as data fields, where sensitive data is known to reside. Discovered sensitive data can be masked to conceal the sensitive data from view outside a production environment. For instance, the sensitive data can be replaced with an arbitrary value, a hash of the sensitive data, or cipher text. Alone, however, masking can have an adverse effect on the ability to diagnose problems or evaluate performance of a production application, for example. Accordingly, metadata associated with sensitive can be maintained. For example, length and equality can be retained. Consequently, sensitive data is not visible but data about the sensitive data is visible outside a production environment.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, management system 100 is illustrated. The management system 100 includes discovery component 110 and cleanse component 120 and is configured to manage production data 130 produced by production application 140 to prevent leakage of sensitive data. Leakage is prevented by removing sensitive data amongst production data or otherwise preventing sensitive data from being introduced in to the production data. As a result, production data can be exposed outside a production environment since sensitive data will not be visible. Additionally, the management system 100 can maintain metadata regarding sensitive data to facilitate analysis.

The production application 140 is a software application that executes in a production environment, as opposed to a pre-production development environment, for example. In other words, the application is deployed in the real world serving end-users/clients and providing value (e.g., business value) to the end-users/clients running the application. As examples, the production application 140 could be a banking application or an online sales application, among other things.

The production data 130 includes data generated during execution of a production application that represents a state of execution at a specific moment time when captured. In particular, the production data 130 can correspond to one or more memory snapshots or dumps that represent the memory state of the production application 140 at a time when the data was captured, or, in other words, when the snapshot was taken or when the dump occurred. Such memory snapshots or dumps can include information about stacks, heaps, loaded classes, objects, and values of fields, logs/traces, among other things. The production data 130 can be employed in a diagnostic context to debug a production application, in which case the production data 130 can be termed a diagnostic artifact. Additionally or alternatively, the production data can be employed in an analytics context to analyze program performance.

The production data 130 can comprise sensitive data, which is production data that needs to be protected or kept secret for one or more reasons including to satisfy regulatory requirements (e.g., federal or state law), organization privacy policies, or user/client configurable privacy settings, among others. One example of sensitive data is personally identifiable information (PII), which can be any data about particular individuals such as a person's name, social security number, driver's license number, account number, credit/debit card number, and security code or password for an account. Other non-limiting examples of sensitive data can include student information and grades as well as health or medical information.

The discovery component 110 and the cleanse component 120 cooperate to prevent sensitive data from being leaked or exposed to unauthorized individuals such as those involved in diagnosing a problem with a production application or those tasked with analyzing production application performance. In particular, the discovery component 110 is configured to discover or identify sensitive data, and the cleanse component 120 is configured to remove, or prevent initial injection of, the sensitive data identified by the discovery component 110.

Figure 2:
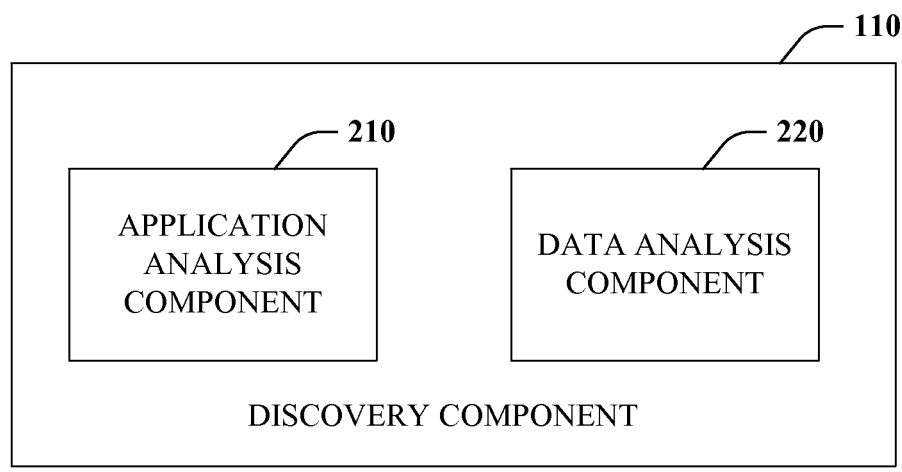
FIG. 2 is a block diagram of a representative discovery component.

The discovery component 110 can be implemented in a variety of manners and operate in different contexts. Turning attention to FIG. 2, a representative discovery component 110 is illustrated in further detail. The discovery component 110 includes application analysis component 210 and data analysis component 220.

The application analysis component 210 is configured to analyze the production application 140 and identify locations where sensitive data is known or likely to reside. In accordance with one implementation, a developer can provide metadata about the nature of sensitive data including specific locations such as class fields where sensitive data is known to reside. Data regarding the location of sensitive data can be specified explicitly in terms of attributes associated with particular data fields, for example. In one embodiment, a developer can annotate the production application 140 with attributes that indicate which fields or other program constructs may include sensitive data. Based on this information, the location where an instance of sensitive data may reside amongst production data 130 is known. Other techniques can also be utilized to determine or infer locations of potential sensitive data based on information from the production application 140. For example, names of variables, classes, functions, or methods, among other things may be indicative of the presence and location of sensitive data.

To facilitate clarity and understanding, consider the following code segment:

```
public class Person
{
    [SensitiveData]
    String Name {get; set;}
    [SensitiveData]
    String SSN {get; set;}
    [SensitiveData]
    String PhoneNumber {get; set;}
}
```

Here, the class "Person" includes three fields, name, social security number (SSN), and phone number. Each field includes an attribute or annotation "SenstiveData" indicating that the fields are known to include sensitive data.

The data analysis component 220 is configured to discover specific instances of sensitive data. In accordance with one embodiment, the data analysis component can exploit information regarding locations that may include sensitive data as determined by the application analysis component 210. Of course, the production application 140 may not have been annotated with data identifying locations of potential sensitive data and thus the application analysis component 210 may not identify any locations of interest based on annotation or other techniques. Accordingly, the data analysis component 220 can be configured to operate independent of results from the application analysis component 210.

Figure 3:
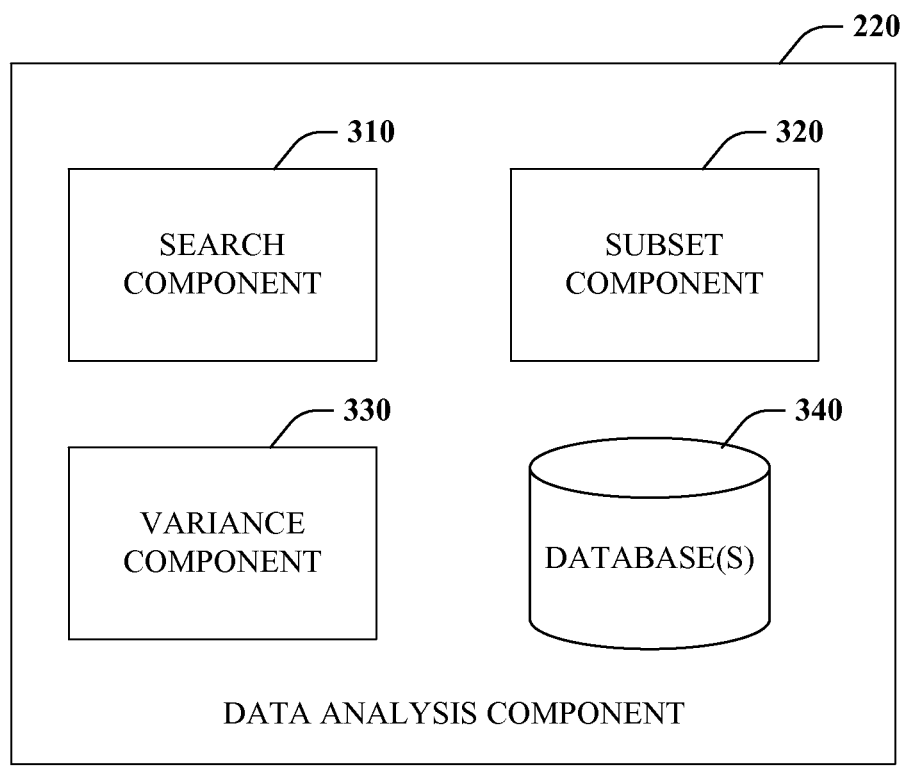
FIG. 3 is a block diagram of a representative data-analysis component.

FIG. 3 depicts a representative data analysis component 220 in further detail. Search component 310 is configured to search a set of production data for sensitive data. In one implementation, the search component 310 can seek to locate sensitive data based on patterns capturing format or other characteristics of sensitive data, for instance utilizing regular expressions or context free grammars. For example, social security numbers comprise three numbers, a dash, two numbers, a dash, and four numbers. This defines a shape of data that corresponds to sensitive data. Based on this data shape, captured by a regular expression, for example, instances of social security numbers can be located. Similar pattern matching can be utilized to locate telephone and account numbers, among other things.

Once a particular instance of sensitive data is identified by way of annotation, pattern matching, or other mechanism, the search component 310 can be employed to identify the same instances of the sensitive data in other locations. For example, if the name of a person is discovered in a particular data field, the search component 310 can seek to locate other instances of the name elsewhere, outside the data field. Consequently, multiple passes over production data may be needed to discover a particular instance of sensitive data and other instances of the discovered sensitive data.

Subset component 320 is configured alone or in conjunction with the search component 310 to identity sensitive data that is a subset of previously discovered or identified sensitive data. For example, if it is determined, based on code annotation or other technique, that a name of a person, including a first name and last name, is sensitive data, the subset component 320 can seek to identify subsets, namely first name and last name, and locate instances of the first name and last name independent of each other. Similarly, if a phone number including an area code is identified as sensitive data, the subset component 320 can attempt to locate a substring of the phone number that does not include the area code.

Variance component 330 is configured alone or in combination with the search component 310 to identify variations of sensitive data. Variations can include but are not limited to differences in format, abbreviations, and misspellings. For example, if by some mechanism a social security number of the format "123-45-6789" is identified as sensitive data, other variations such as "123 45 6789" can also be searched for an if located labeled as sensitive data. As another example, suppose the name "David Doe" is considered sensitive data. In this case, the variation component 330 can enable identification of instances of data such as "D. Doe" or "Dave Doe" as equivalent and sensitive data as well.

The database 340 can be a computer-readable storage medium that stores data locally as shown, or remotely, for use by components of the data analysis component 220 in locating sensitive data. In one instance, the database 340 can include data known to correspond to sensitive data such as names and addresses for use by the search component 310. Common patterns can also be stored in the database 340 for employment by the search component 310. As another example, the database 340 can include common misspellings of words or names as well as abbreviations for used by the variance component 330. As yet another example, the database 340 can include a language dictionary that can be employed to discover proper nouns by searching against the language dictionary and marking anything not found as a proper noun.

Figure 4:
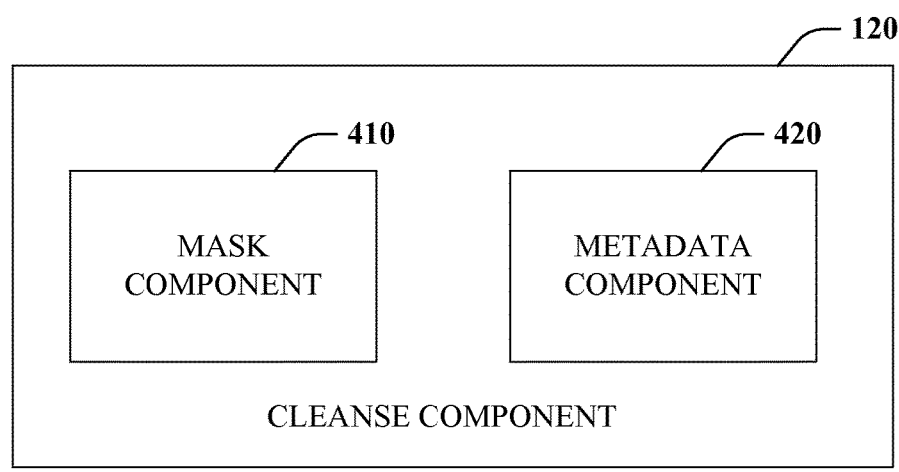
FIG. 4 is a block diagram of a representative cleanse component.

FIG. 4 illustrates a representative cleanse component 120 that can be employed in conjunction with the management system 100 of FIG. 1. The cleanse component includes mask component 410 and metadata component 420.

The mask component 410 is configured to remove sensitive data amongst production data. In one instance, the mask component 410 is configured to replace the sensitive data with other non-sensitive data. In other words, the mask component 410 is configured to conceal sensitive data by replacing the sensitive data with non-sensitive data. In one embodiment, the mask component 410 can employ a hash algorithm to sensitive data with a hash of the sensitive data. In another embodiment, an encryption algorithm can be utilized to replace sensitive data with cipher text. In yet another embodiment, the mask component 410 can simply replace sensitive data with arbitrary values.

The metadata component 420 is configured to maintain metadata regarding sensitive data. Masking of sensitive data by way of the mask component 410 removes sensitive data. Alone, however, masking can have an adverse effect on the ability to diagnose problems or evaluate performance of a production application. Metadata component 420 can at least mitigate this problem by maintaining data about sensitive data that is concealed with a mask. The metadata can include data that is helpful in diagnosis sources of a bug or analyzing program performance. For example, the length of a data value can indicate the presence of a software error, flaw, or failure. Accordingly, the metadata component 420 can maintain the length of the sensitive data (e.g., string length). As a result, helpful data is preserved without exposing the sensitive data. Another non-limiting example of useful data that can be retained as metadata is value equality. In other words, metadata can indicate whether or not masked sensitive data is the same or different from other masked sensitive data.

The metadata component 420 can maintain metadata a number of different ways. In one implementation, metadata can be appended (e.g. prepend, postpend) to masked data. For example, the length of data can be appended to the masked data. In another implementation, metadata can be embedded or encoded within the masked data. For instance, the length of the masked data can be the same as the sensitive data (e.g., variable length hash). Similarly, identical, similar, or equivalent sensitive data can be concealed with the same mask or, stated differently, replaced with a matching value. Additionally, a mask for a subset of the data can be generated based on the mask for a superset of the data or vice versa, for example where the mask for a full name is composed of a mask for a first name and a mask for a last name. In another implementation, metadata can be encrypted as part of multiple layer encryption process where a key is provided to access data about the sensitive data by way of a partial decrypt but not the sensitive data itself. In yet another implementation, the metadata component 420 can store metadata separately from the mask in a data source (e.g., database, other memory stream . . . ), and subsequently a lookup against the source can be performed, for instance based on the mask value and/or memory addresses to acquire the metadata. For example, the metadata component 420 can be configured to write metadata to an arbitrary buffer along with identifiers that identify corresponding masked data. The above implementations represent but a few exemplary ways in which metadata can be maintained. Others are possible and are to be deemed within the scope of this disclosure.

What follows is example scenario in which aspects of the disclosure can be employed. The purpose is to aid clarity and understanding with respect to aspects of the subject disclosure and not to limit the appended claims thereto. For instance, the scenario relates to a diagnostic context, but the disclosed aspects are not limited thereto.

Consider a scenario in which a developer designs and implements a medical application. As part of this process, the developer can mark the various fields that may identify a patient as sensitive. Examples of such fields include, name, social security number, address, and phone number, among other things. When a problem occurs with the application executing in a production environment, a diagnostic artifact can be produced by a production diagnostic system comprising production data. The artifact could be a full process dump or a trace file, among other things. Any data field that was marked as sensitive can be masked out of the diagnostic artifact, for example using a cryptographically strong hash. Further, metadata regarding the sensitive data is retained. This ensures significant diagnostic information such as buffer length and equality are preserved, but sensitive data is removed. By way of example, instances of the string "John Doe" are replaced with an identical hash of same length as the original data "T %=1_PC$" in the diagnostic file. Thus, equality and length are still visible, but the sensitive data is not visible. Alternatively, a fixed length hash or data index plus length could be used. Discovered instances of sensitive data need not be limited to fields marked as sensitive. Rather, all data collected can be checked against discovered sensitive data in multiple passes. This can include the heap, stack, and registers of a process dump or the contests of (or substring of) any fields in the diagnostic trace file. Further, subsets and variations of discovered sensitive data can be identified. Sensitive data can be destructively overwritten in the diagnostic file with the hash so it cannot be obtained by a developer. Later, when the developer consumes the diagnostic file, the sensitive data is masked and thus is not available. For instance, the name "John Doe" is not visible, but the hash and length are visible.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the discovery component 110 can include such mechanism to determine or infer sensitive data. For instance, a learning mechanism can be used to identified data that otherwise may be been missed.

Missed instances can exist for several reasons. First, temporary copies are created by a compiler (e.g., JIT compiler), such as enregistered values, which are values stored in registers instead of on a stack. A second reason is loss of type information by a developer (e.g., casting a buffer to void*), such that the type cannot be readily inferred. Another reason is stale copies of sensitive data sitting in memory that has been freed by the application but not overwritten by the operating system. For example, stack variables for frames that have already popped usually are still in memory under the current stack pointer and freed heap values are often not overwritten when variables are in question or freed.

Figure 5:
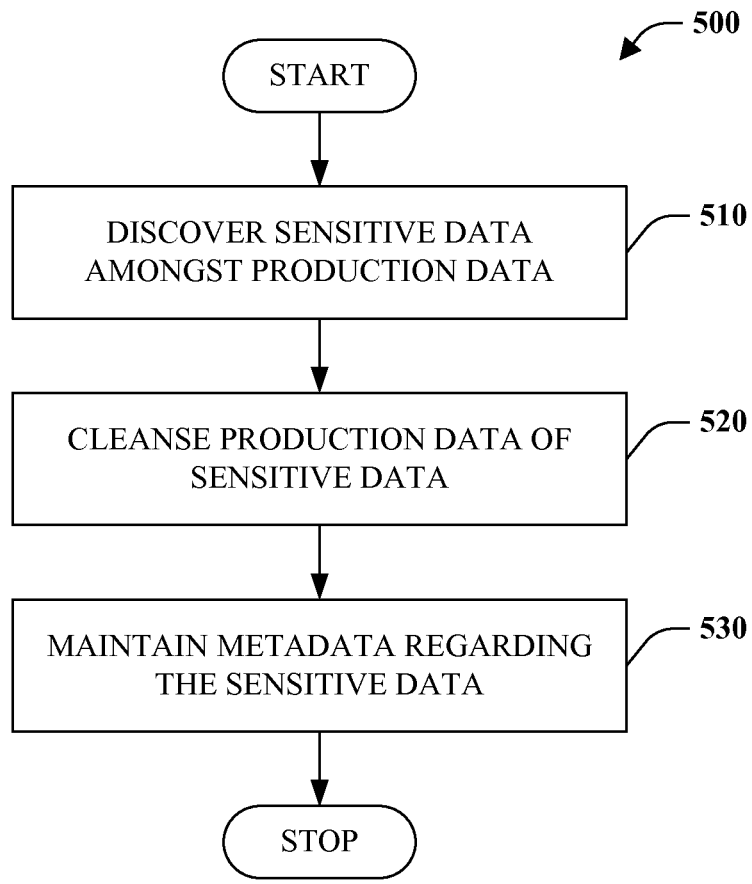
FIG. 5 is a flow chart diagram of a method of managing production data.
Figure 6:
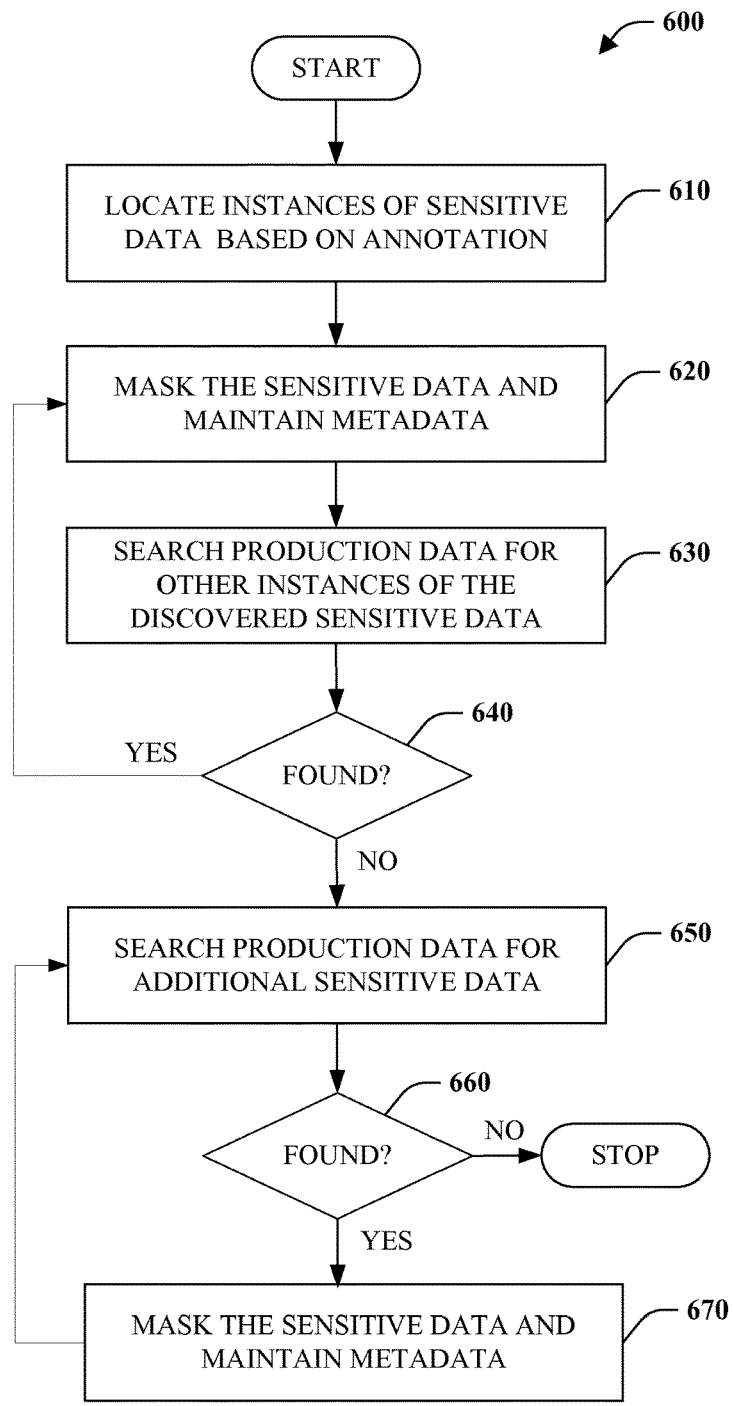
FIG. 6 is a flow chart diagram of a method of discovering and masking sensitive production data.

In view of the exemplary systems described above, methodologies that may be implemented in accordance with the disclosed subject matter will be better appreciated with reference to the flow charts of FIGS. 5 and 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. More-over, not all illustrated blocks may be required to implement the methods described hereinafter.

Referring to FIG. 5, a method of managing production data 500 is illustrated. At reference numeral 510, sensitive data is discovered amongst production data. Production data represents a state of execution at a specific moment time when captured and can include process stacks, process heap, stack frame registers, and logging/tracing, among other things. Sensitive data can be discovered by way of various techniques/mechanisms. For instance, instances of sensitive data can be discovered based on class data fields in an application marked as including sensitive data. The production data can also be searched to locate known sensitive data, subsets of sensitive data, and variations of sensitive data. For example, regular expression or context free grammar searching can be performed to locate instances of data that match a particular form or format (e.g., social security numbers, phone numbers . . . ).

At numeral 520, production data is cleansed of discovered sensitive data. The production data can be cleansed by replacing the sensitive data with non-sensitive data. In other words, sensitive data can be masked to conceal the sensitive data. By way of example, a hash algorithm can be applied to sensitive data to generate a hash value as the mask, and the sensitive data can be replaced with the mask. Alternatively, sensitive data can be masked by encrypting the sensitive data. Still further, the sensitive data can be overwritten with an arbitrary value.

At reference 530, metadata regarding sensitive data is maintained. The metadata can include data about the sensitive data that is useful for some purpose such as diagnostics or analytics. For example, the metadata can include the length (e.g., string length) of the sensitive data and content identity. This can allow instances of the same data to be recognized as the same (identity), and other pieces of data such as length to be used in deducing a cause of a problem, for instance. The metadata can be maintained in numerous ways including appending the metadata to masked sensitive data, embedding the metadata within the masked data, or saving the metadata to a store (e.g., database, memory stream . . . ) separate from the masked data. As examples, length can be appended to masked data or the masked data can be of the same length as the sensitive data. Similarly, the same mask can be used for the same or equivalent instances of sensitive data.

FIG. 6 illustrates a method of discovering and masking sensitive production data. 600. At numeral 610, instances of sensitive data are located based on a code annotation or attribute that identifies one or more locations, such as data fields, where sensitive data is known to reside. At 620, the sensitive data is masked and metadata associated with it determined and retained as part of the masked data or separate from the masked data. Since instances of sensitive data are not confined to identified locations, production data is searched, at numeral 620, for other instances of the previously discovered sensitive data. If other instances are found at reference 640 ("YES"), the method proceeds back to numeral 620 where the instance is masked. If no other instances are found at 640 ("NO"), the method continues at 650. At reference 650, production data is searched for additional sensitive data. For example, the production data can be searched with a with regular expressions or context free grammars that match patterns of data known to be sensitive such as, but not limited to, social security numbers and telephone numbers. Addresses can also be discovered with a like search or by cross correlating with mapping software. The production data can also be searched for subsets and variations of previously identified sensitive data. At numeral 660, a determination is made as to whether additional sensitive data was found. If so ("YES"), the method continues at 670, where the additional sensitive data is masked and metadata maintained. Subsequently, the method loops back to reference 650. If a numeral 660, no additional data was found ("NO"), the method terminates.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
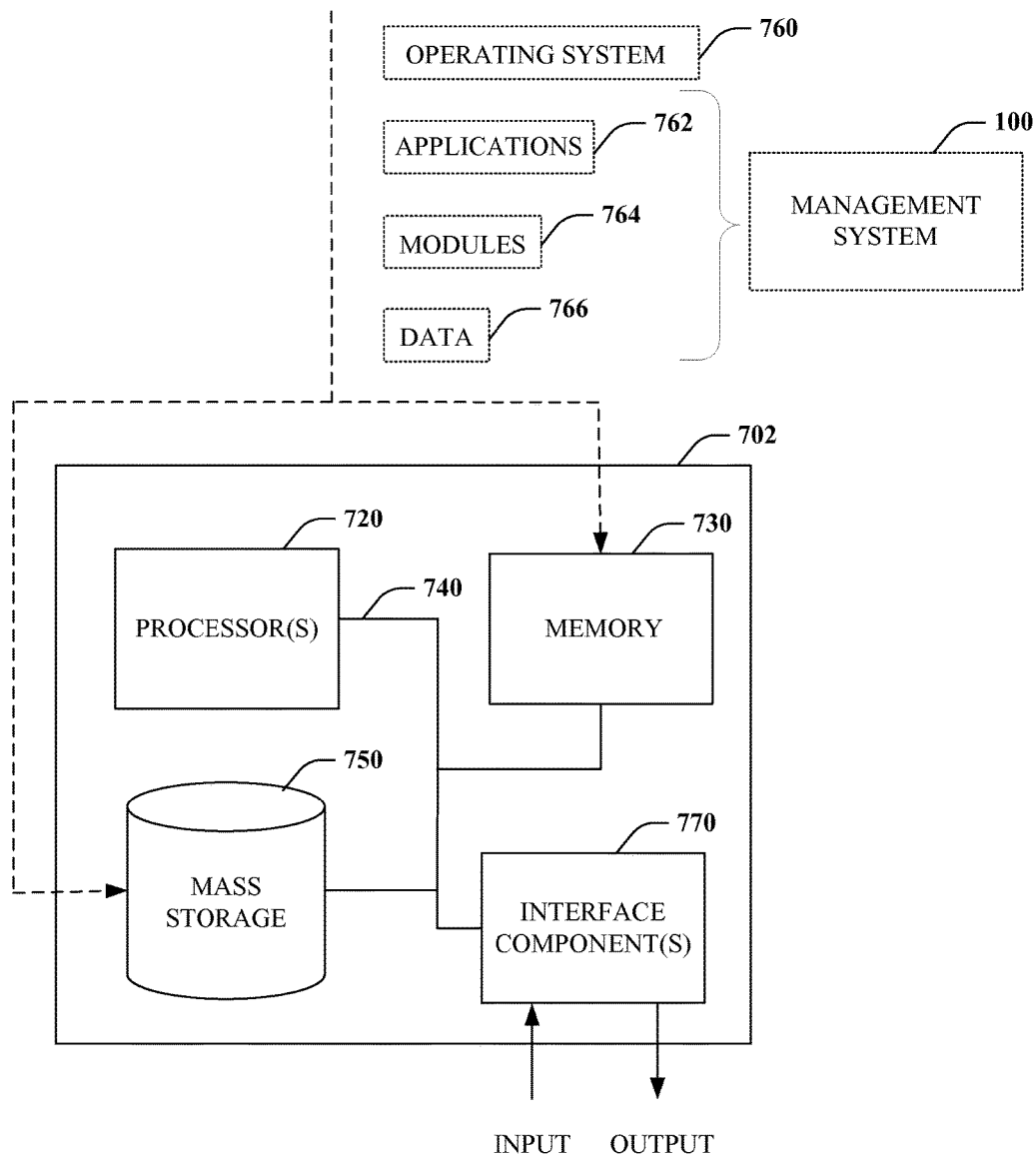
FIG. 7 is a schematic block diagram illustrating a suitable operating environment for aspects of the subject disclosure.

In order to provide a context for the claimed subject matter, FIG. 7 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 7, illustrated is an example general-purpose computer or computing device 702 (e.g., desktop, laptop, tablet, server, hand-held, programmable consumer or industrial electronics, set-top box, game system, compute node . . . ). The computer 702 includes one or more processor(s) 720, memory 730, system bus 740, mass storage 750, and one or more interface components 770. The system bus 740 communicatively couples at least the above system components. However, it is to be appreciated that in its simplest form the computer 702 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that can be used to store, as opposed to transmit, the desired information accessible by the computer 702. Accordingly, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the management system 100, or portions thereof, can be, or form part, of an application 762, and include one or more modules 764 and data 766 stored in memory and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the continuous protection component 136 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., LCD, LED, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computer-implemented method, comprising:
    receiving data capturing application state from a memory by a processor at a particular time during execution of an application in a production environment;
    identifying an instance of sensitive data at a location indicated by one or more code annotations in the application, wherein a code annotation comprises metadata within the application that explicitly indicates a data field comprises sensitive data;
    searching the data for another instance of the sensitive data at a different location within the application;
    generating a mask for the sensitive data that conceals the sensitive data;
    maintaining metadata that captures one or more characteristics of the sensitive data; and
    replacing the sensitive data with the mask.

2. The method of claim 1, maintaining the metadata comprises appending the metadata to the end of the mask.

3. The method of claim 1, maintaining the metadata comprises encoding the metadata within the mask.

4. The method of claim 1, maintaining the metadata comprises storing the metadata separately from the mask.

5. The method of claim 1, maintaining the metadata comprises capturing length of the data.

6. The method of claim 1, generating the mask comprises encrypting the data.

7. The method of claim 1, generating the mask comprises applying a hash algorithm to the data.

8. The method of claim 1 further comprises generating the mask for a subset of the data based on a mask for a superset of the data.

9. The method of claim 1, identifying a data field of the application with the code annotation.

10. A system, comprising:
a processor coupled to a memory, the processor configured to execute the following computer-executable components stored in the memory:
an application analysis component that identifies an instance of production data as sensitive data that requires concealment at a location indicated by one or more code attributes in an application, wherein a code attribute comprises metadata within the application that expressly indicates a data field comprises sensitive data, and the production data captures application state from memory at a particular time during execution of the application in a production environment;
a search component that locates another instance of the sensitive data at a different location in the application; and
a cleanse component that replaces the sensitive data with non-sensitive data.

11. The system of claim 10, the search component further discovers the sensitive data by identification of a pattern that describes sensitive data in the production data.

12. The system of claim 10 further comprises a subset component that discovers a subset of previously discovered sensitive data.

13. The system of claim 10, the sensitive data comprises at least part of a diagnostic artifact.

14. The system of claim 10 further comprises a metadata component that saves metadata that captures at least one characteristic of the sensitive data.

15. A computer-readable storage medium having instructions stored thereon that enable at least one processor to perform a method upon execution of the instructions, the method comprising:
receiving data capturing application state from a memory by a processor at a particular time during execution of an application in a production environment;
identifying an instance of sensitive data that requires concealment at a location indicated by one or more code annotations in the application, wherein a code annotation comprises metadata within the application that explicitly indicates a data field comprises sensitive data;
searching the data for another instance of sensitive data at a different location within the application;
generating a mask that conceals the sensitive data; and
replacing the sensitive data with the mask.

16. The computer-readable storage medium of claim 15, the method further comprises maintaining metadata that captures one or more characteristics of the sensitive data.

17. The computer-readable storage medium of claim 16, the method further comprises appending the metadata to the mask.

18. The computer-readable storage medium of claim 15, the method further comprises generating the same mask for identical sensitive data.

19. The system of claim 10, the cleanse component replaces the sensitive data with non-sensitive data generated as a function of the sensitive data.

20. The system of claim 19, the cleanse component replaces the sensitive data with non-sensitive data that comprises metadata regarding one or more characteristics of the sensitive data.

* * * * *